United States Patent [19]

Matsuoka

[11] Patent Number: 4,855,856
[45] Date of Patent: Aug. 8, 1989

[54] CLEANING DEVICE FOR VHS VIDEO CASETTE PLAYERS

[75] Inventor: Kenzo Matsuoka, Hyogoken, Japan

[73] Assignee: Nippon Seiki Hoseki Kogyo, Japan

[21] Appl. No.: 48,748

[22] Filed: May 11, 1987

[30] Foreign Application Priority Data

Jun. 20, 1986 [JP] Japan ............... 61-145085

[51] Int. Cl.$^4$ .............................. G11B 5/41
[52] U.S. Cl. ..................... 360/128; 360/137
[58] Field of Search ......... 360/128, 137; 15/210 R, 15/DIG. 12

[56] References Cited

U.S. PATENT DOCUMENTS

| 4,462,056 | 7/1984 | Kara | 360/128 |
| 4,490,761 | 12/1984 | Wolynski et al. | 360/120 |
| 4,580,185 | 4/1986 | Clausen et al. | 360/137 X |
| 4,761,700 | 8/1988 | Fritsch | 360/128 |

FOREIGN PATENT DOCUMENTS

| 3527373 | 2/1987 | Fed. Rep. of Germany | 360/128 |
| 0071410 | 4/1986 | Japan | 360/128 |

Primary Examiner—Stuart N. Hecker
Assistant Examiner—David J. Severin
Attorney, Agent, or Firm—Barnes & Thornburg

[57] ABSTRACT

A cleaning device for a VHS video casette player, the cleaning device comprising a case; a first reel and a second reel provided in the case, one of the reels being for supplying a cleaning tape and the other being for receiving the same; wherein the case includes an outlet for supplying the cleaning tape therethrough, and an inlet for receiving it therethrough; a pair of pockets provided between the outlet and inlet; and a regulator means for reducing the area of contact of the cleaning tape with the surface of the head, the regulator means being located between the two pockets.

5 Claims, 1 Drawing Sheet

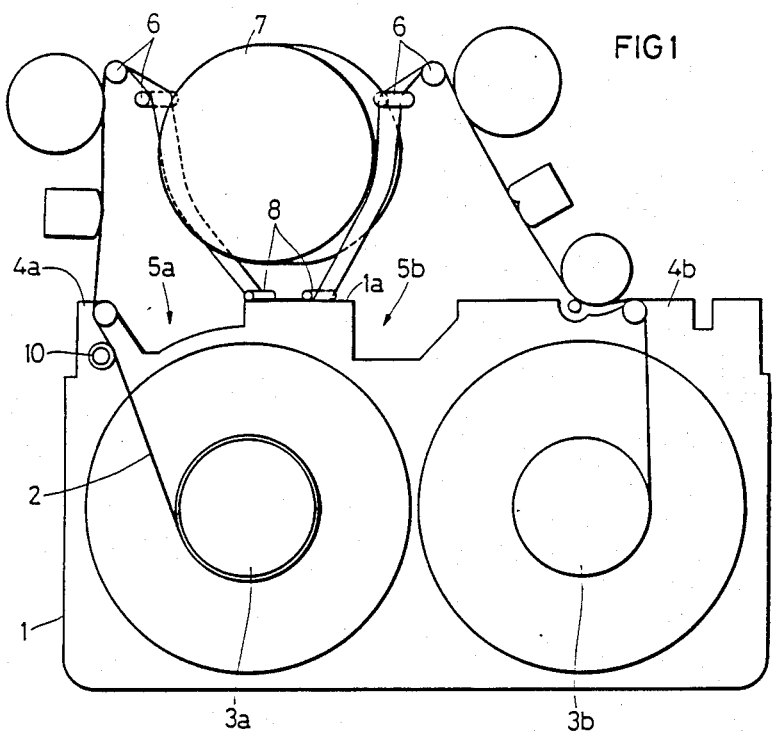
FIG 1
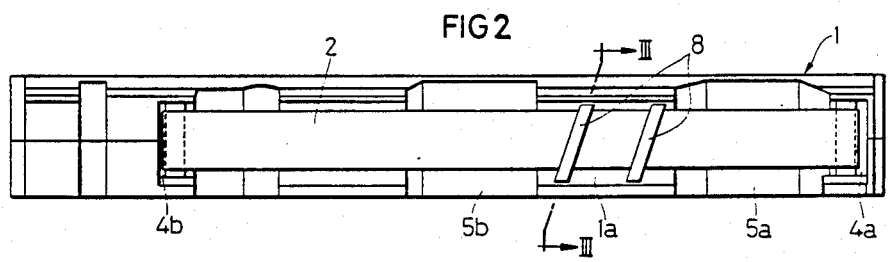
FIG 2 (PRIOR ART)
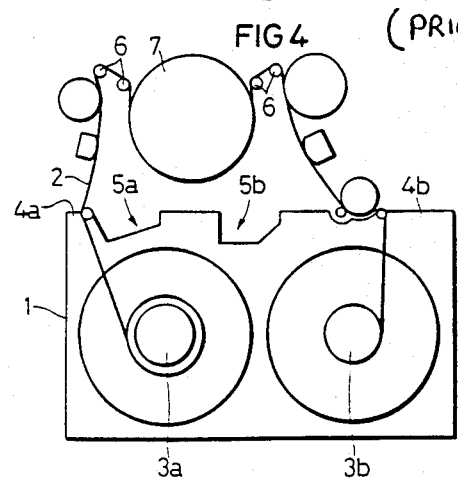
FIG 3
FIG 4

CLEANING DEVICE FOR VHS VIDEO CASETTE PLAYERS

BACKGROUND OF THE INVENTION

1. Field of the Invention

The present invention relates to a cleaning device for VHS video casette players.

2. Description of the Prior Art

To explain the prior art cleaning device reference will be made to FIG. 4:

The cleaning device shown in FIG. 4 is loaded with a cleaning tape 2, which is fed from a first reel 3a and wound around a second reel 3b, during which the cleaning tape 2 keeps contact with the surface of a player head so as to clean it. The reference numeral 1 denotes a case, which includes an outlet 4a and an inlet 4b. The reference numerals 5a and 5b denote pockets through which the cleaning tape 2 is loaded in the case 1.

When this type of cleaning device is loaded in the video player to clean the head 7 of the player, the cleaning tape 2 is kept in contact with its peripheral surface in the form of a reverse Ω letter, which means that a large part of the head 7 keeps contact with the tape 2 as is evident from FIG. 4.

The known cleaning tape is made of rough material such as leather or cloth, and tends to abrade the surface of the head. In addition, the head 7 exerts a relatively strong physical resistance on the cleaning tape because of the surfacial roughness on the tape, sometimes to the extent that the cleaning tape 2 becomes separated from the deck of the player. This often happens when the cleaning-tape is a wet type, that is, the tape is impregnated with a cleaning agent. The dampness on the cleaning tape 2 increases th resistance on the head 7.

OBJECTS AND SUMMARY OF THE INVENTION

The present invention aims at solving the problem pointed out with respect to the known cleaning device, and has for its object to provide a video casette cleaning device which avoids the cleaning tape applying a heavy load to the head of the player, thereby minimizing friction therebetween.

Other objects and advantages of the present invention will become more apparent from the following detailed description, when taken in conjunction with the accompanying drawings which show, for the purpose of illustration only, one embodiment in accordance with the present invention.

According to the present invention there is provided a cleaning device for a VHS video casette player, the cleaning device comprising:
 a case;
 a first reel and a second reel provided in the case, one of the reels being for supplying a cleaning tape and the other being for receiving the same;
 wherein the case includes an outlet for supplying the cleaning tape therethrough, and an inlet for receiving it therethrough;
 a pair of pockets provided between the outlet and inlet; and
 a regulator means for reducing the area of contact of the cleaning tape with the surface of the head.

BRIEF DESCRIPTION OF THE DRAWINGS

FIG. 1 is a plan view showing a cleaning device embodying the present invention;

FIG. 2 is a front view showing the cleaning device of FIG. 1;

FIG. 3 is a cross-sectional view taken along the line III—III in FIG. 2; and

FIG. 4 is a plan view showing a prior art cleaning device.

DETAILED DESCRIPTION OF THE PREFERRED EMBODIMENTS

Referring to FIGS. 1 to 3 the cleaning device according to the present invention has basically the same structure as that of the prior art referred to above. Like reference numerals denote like parts or components throughout FIGS. 1 to 4.

The cleaning device of the invention is characterized by a regulator means, which comprises a pair of semi-ring members 8 each having a flat back portion 8a, legs 8c and jaws 8c as clearly shown in FIG. 3. The semi-ring members 8 are secured to the case 1 by inserting the legs 8b in the case 1 through apertures 1a. The legs 8b are secured to the case 1 by the jaws 8c, which are shaped so that when the insertion is finished a space is produced between the flat back portion 8a and a side of the case 1. The space allows the cleaning tape 2 to be placed therein. The semi-ring members 8 are secured to the case 1 at the same angle as the angle of decline of the head 7; usually at 19° to 24°. In practice the cleaning tape 2 is initially placed on the side of the case 1, and the legs 8b of the semi-ring members 8 are inserted into the apertures 9.

The reference numeral 10 denotes a roller whereby a cleaning agent is applied to the tape 2 while it keeps contact therewith.

When the cleaning device is mounted on the deck of the casette player the cleaning tape 2 is controlled by the regulator means 8 so that that part of the tape which is located between the semi-ring members 8 is kept out of contact with the head 7 as clearly shown in FIG. 1. The semi-ring members 8 are arranged in parallel with the axis of the head 7, thereby keeping the other parts of the cleaning tape 2 in full contact with the surface of the head 7. The full contact of the cleaning tape with the surface of the head enhances the cleaning efficiency.

The regulator means is provided by a semi-ring member 8 but the shape thereof is not limited to it. For example a flat bar or a plate can be effectively used. The regulator means can be made in one piece with the case 1. The number of the regulator means is not limited to two; for example, a single semi-ring member can be used.

What is claimed is:

1. A cleaning device for a VHS video cassette player, the cleaning device comprising a case including:
 first and second reels for supplying and receiving a cleaning tape;
 an outlet for supplying the cleaning tape therethrough, and an inlet for receiving it therethrough; and
 a regulator means adapted to reduce the area of contact of the cleaning tape with a surface of a head of the player, wherein the regulator means comprises a pair of tape guide semi-ring members detachably connected to the case at locations spaced from one another.

2. A cleaning device according to claim 1, wherein the tape guide semi-ring members each have a flat back portion, legs, and jaws adapted to accommodate insertion of the cleaning tape between the flat back portions and the case.

3. A cleaning device according to claim 2, wherein the legs are insertable into apertures produced in the case and are secured thereat by the jaws.

4. A cleaning device according to claim 3, wherein the semi-ring members are secured to the case to accommodate tape contact at the cleaning head at the same angle as the angle of decline of the head.

5. A cleaning device according to claim 3, wherein the case further includes a pair of pockets provided between the outlet and inlet for accommodating loading of the cleaning tape.

* * * * *